(No Model.) 6 Sheets—Sheet 1.
J. OLSON.
FLUID PRESSURE RAILWAY BRAKE.
No. 587,450. Patented Aug. 3, 1897.
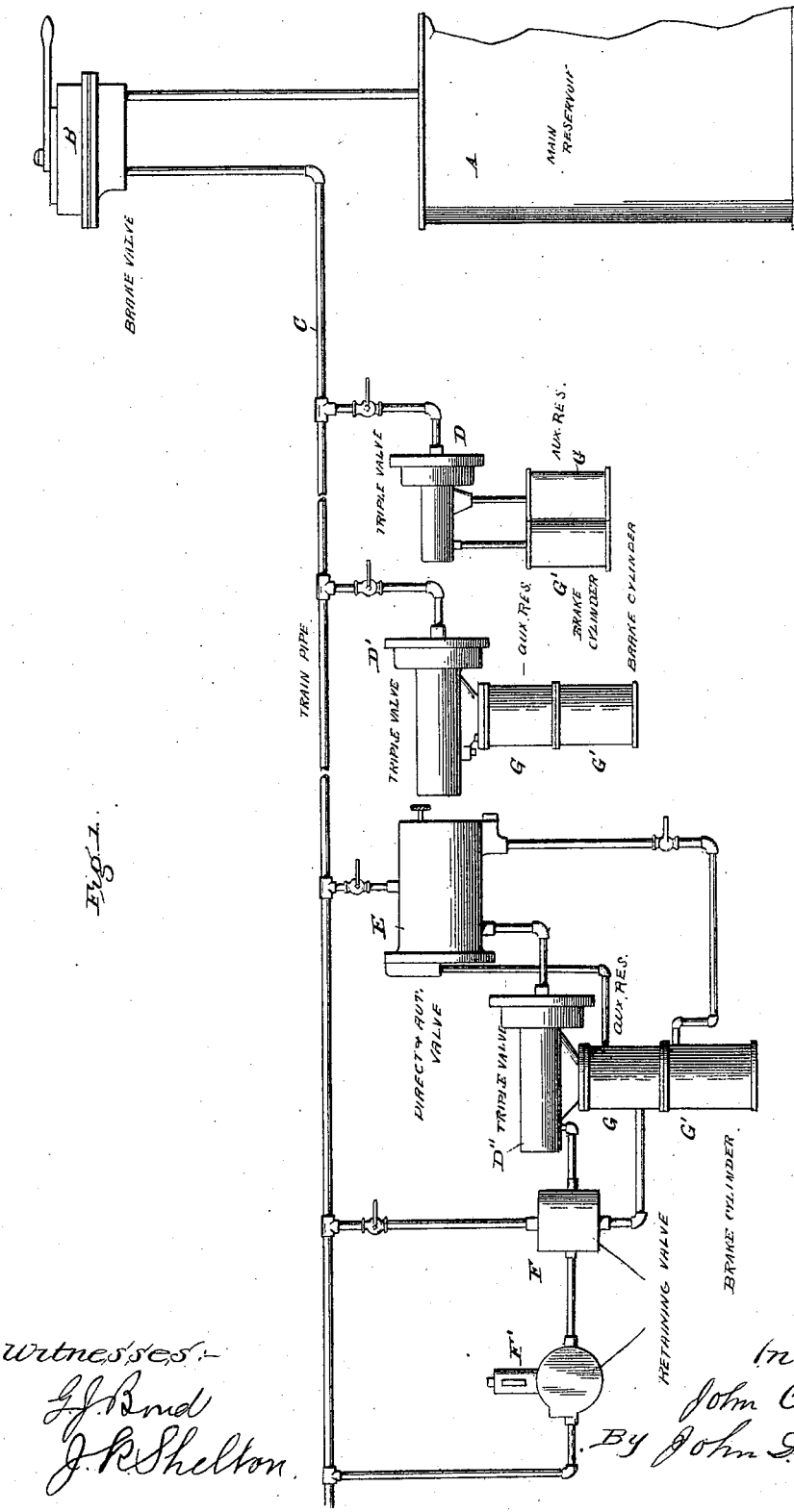

(No Model.) 6 Sheets—Sheet 2.
J. OLSON.
FLUID PRESSURE RAILWAY BRAKE.
No. 587,450. Patented Aug. 3, 1897.
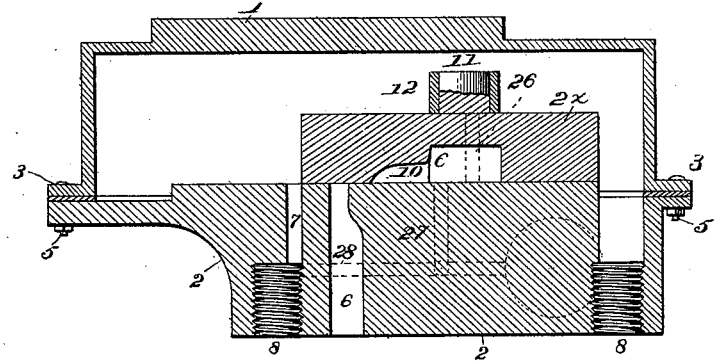
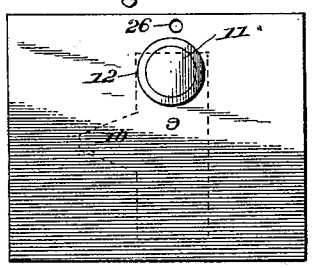
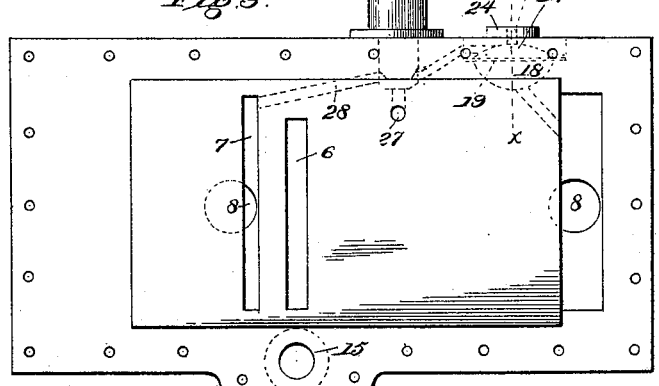
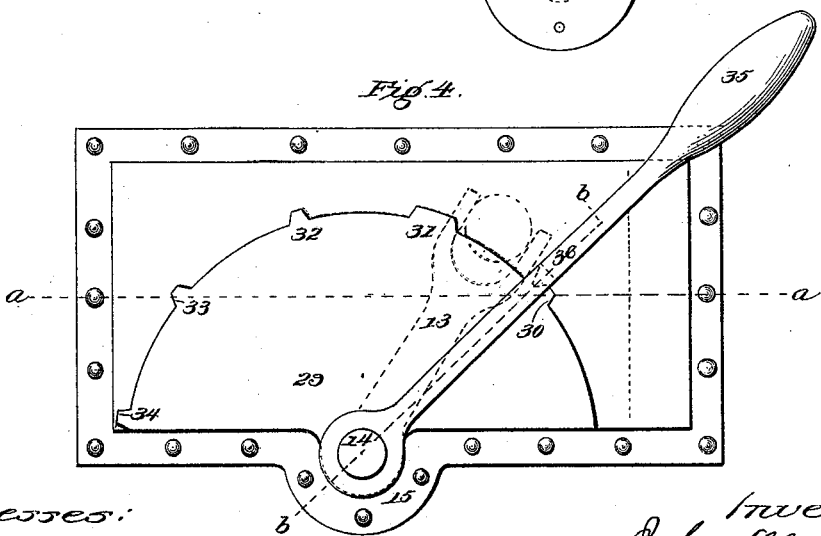

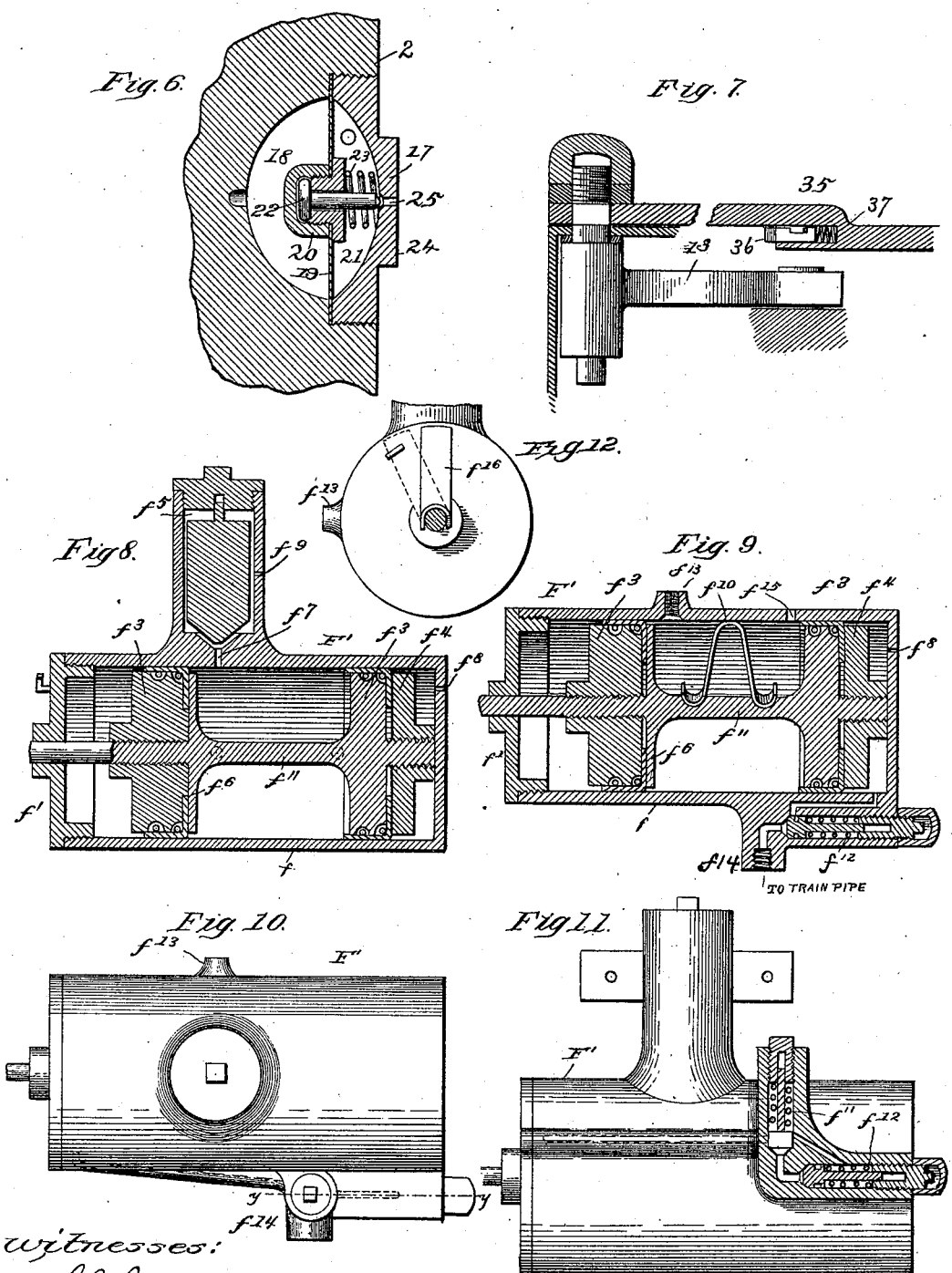

(No Model.) 6 Sheets—Sheet 4.
J. OLSON.
FLUID PRESSURE RAILWAY BRAKE.
No. 587,450. Patented Aug. 3, 1897.
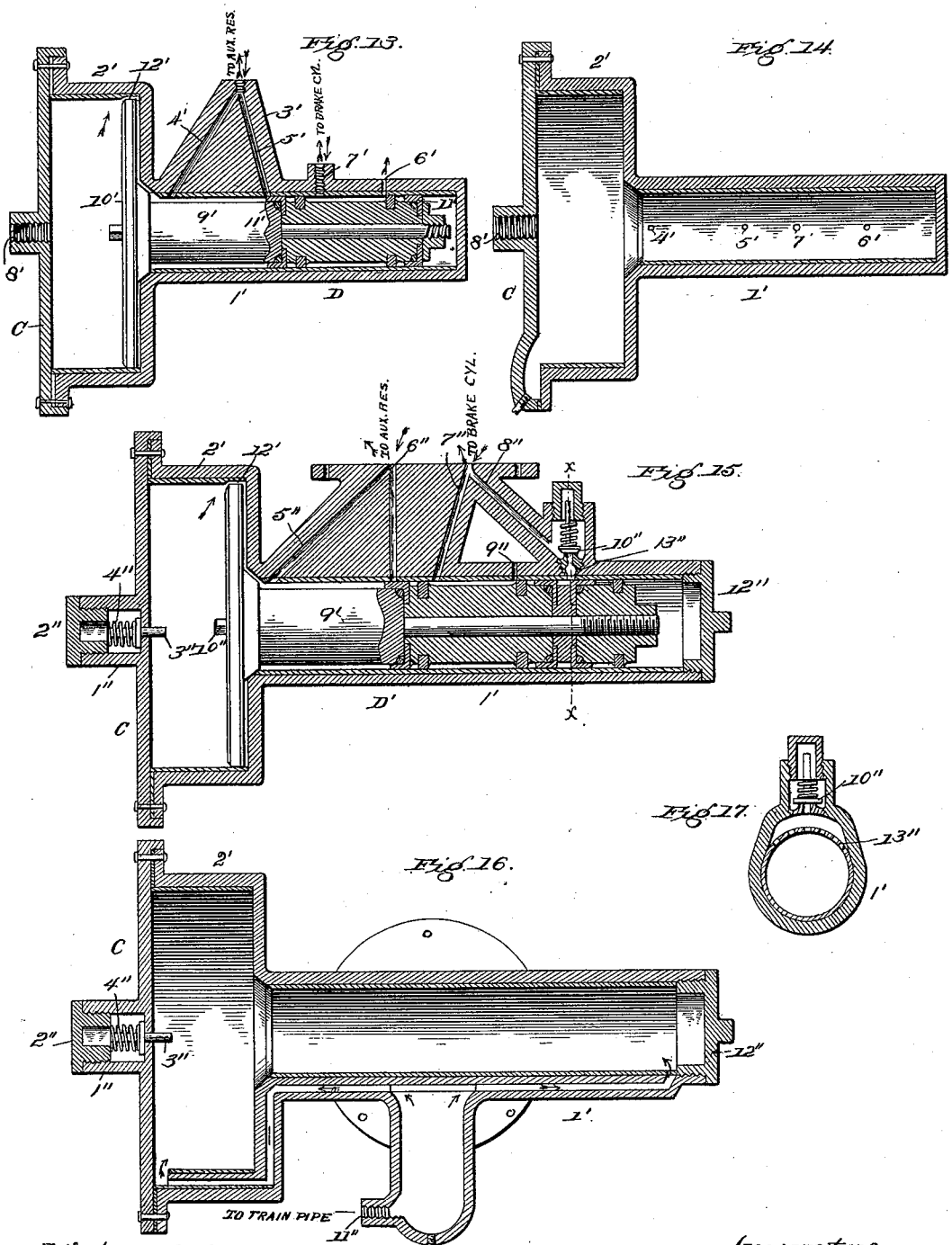
Witnesses
G. J. Bond
J. R. Shelton
Inventor
John Olson
By John F. Hyer
Atty.

(No Model.) 6 Sheets—Sheet 5.
J. OLSON.
FLUID PRESSURE RAILWAY BRAKE.
No. 587,450. Patented Aug. 3, 1897.
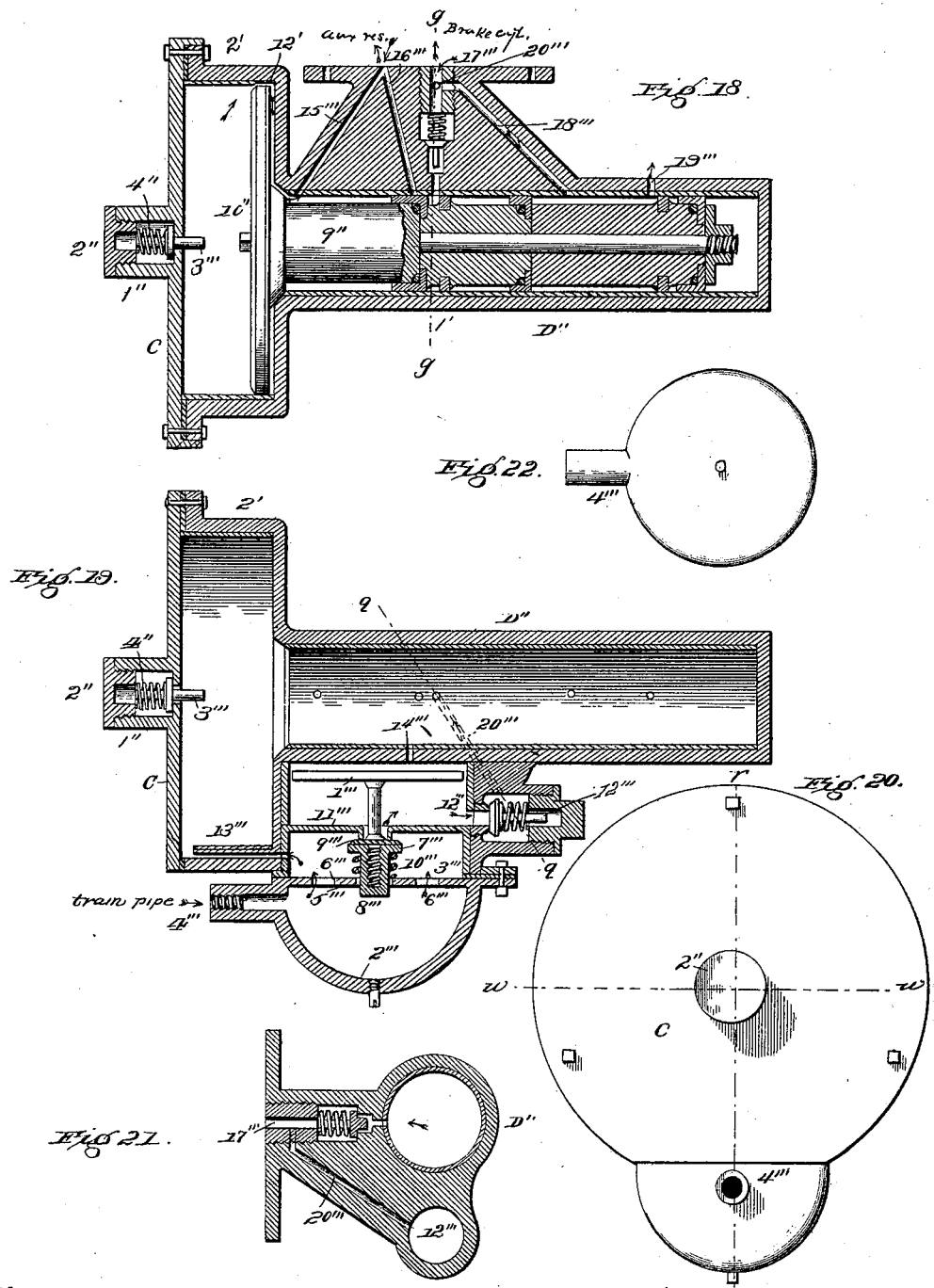
Witnesses
G. J. Bond
J. R. Shelton
Inventor
John Olson
By John D. Hyer
Atty (No Model.) 6 Sheets—Sheet 6.
J. OLSON.
FLUID PRESSURE RAILWAY BRAKE.
No. 587,450. Patented Aug. 3, 1897.
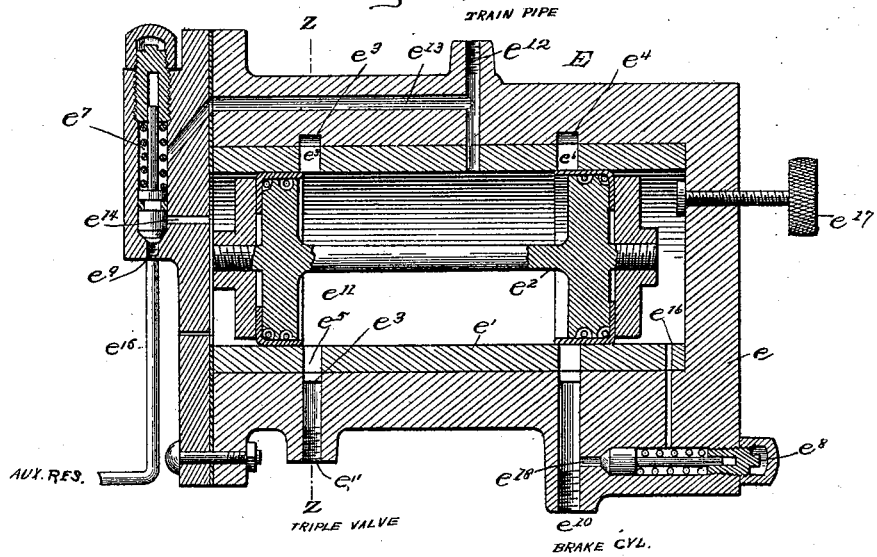
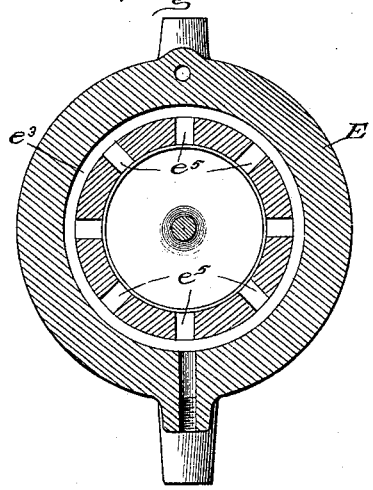
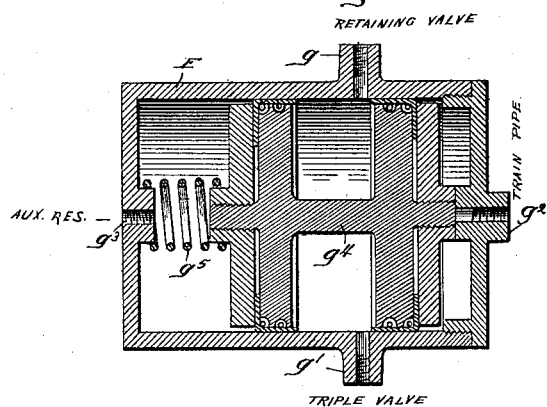

UNITED STATES PATENT OFFICE.

JOHN OLSON, OF TWO HARBORS, MINNESOTA.

FLUID-PRESSURE RAILWAY-BRAKE.

SPECIFICATION forming part of Letters Patent No. 587,450, dated August 3, 1897.

Application filed April 27, 1894. Serial No. 509,210. (No model.)

*To all whom it may concern:*

Be it known that I, JOHN OLSON, a citizen of the United States, residing at Two Harbors, in the county of Lake and State of Minnesota, have invented certain new and useful Improvements in Fluid-Pressure Railway-Brakes; and I do hereby declare the following to be a full, clear, and exact description of the invention, such as will enable others skilled in the art to which it appertains to make and use the same.

My invention relates to fluid-pressure brakes for railways; and it consists in certain novel constructions for engineer's brake-valve, triple valves, automatic and direct valve, two retaining-valves, and connections, forming a complete system of fluid-pressure brakes, as will be fully hereinafter described.

The objects of my invention are to construct a brake system by means of which either automatic or direct pressure may be used at will and to provide a very quick acting triple valve on the cars, slower-acting ones on the tender, and still slower ones on the engine, so that the pressure may be uniformly applied and maintained throughout the line, as well as to simplify the construction of the valves.

Referring to the drawings forming a part of this specification, Figure 1 is a diagrammatic view showing the arrangement of the different valves and cylinders throughout the entire line. Fig. 2 is a vertical section of the engineer's brake-valve on the line $a\ a$, Fig. 4. Fig. 3 is a top plan view of said valve with the cap-plate or cover removed. Fig. 4 is a top plan view of the engineer's brake-valve, showing the operating-lever. Fig. 5 is a top plan view of the slide-valve. Fig. 6 is an enlarged section taken on line $x\ x$ of Fig. 3, showing the signal or warning valve. Fig. 7 is a section taken on line $b\ b$, Fig. 4. Fig. 8 is a transverse section of one form of retaining-valve. Fig. 9 is a section at right angles to Fig. 8. Fig. 10 is a top plan view of said valve. Fig. 11 is a view in elevation, partly in section, of the same on line $y\ y$, Fig. 10. Fig. 12 is a detail of a locking device on said valve. Fig. 13 is a horizontal section of the triple valve used on the engine. Fig. 14 is a view at a right angle to Fig. 13 with the piston removed. Fig. 15 is a horizontal section of the form of triple valve used on the tender. Fig. 16 is a view of the valve shown in Fig. 15, at a right angle thereto and with the piston removed. Fig. 17 is a detail in section of the check-valve and ports below it. Fig. 18 is a horizontal section of the form of triple valve used on the cars, taken on line $w\ w$, Fig. 20. Fig. 19 is a section taken on the line $r\ r$, Fig. 20. Fig. 20 is an end elevation of the valve. Fig. 21 is a section on line $g\ g$, Fig. 18. Fig. 22 is a bottom view of the drain-cup covering the emergency-valve. Fig. 23 is a vertical section of a valve for changing the pressure from automatic to direct. Fig. 24 is a view in section on line $z\ z$, Fig. 23. Fig. 25 is a cross-section of the retaining-valve for arresting the exhaust from the triple valve when the auxiliary cylinders are recharged.

On the drawings like letters and numerals indicate corresponding parts in the different views.

The parts shown in the accompanying illustration in Fig. 1 are represented substantially as they are arranged and in use on the train.

A represents the main reservoir, B the engineer's brake-valve suitably connected with the reservoir, and C the train-pipe and its couplings. D is the triple valve for the engine, D' for the tender, and D" for the cars.

E is a peculiar form of valve for allowing the use of either direct or automatic pressure.

F F' are two forms of retaining-valves, and G G' are auxiliary reservoirs and brake-cylinders, respectively, for each of the triple valves.

Engineer's Brake-Valve.

The engineer's brake-valve B is fully shown on Sheet 2 of the drawings and in Figs. 6 and 7 of Sheet 3. It consists, mainly, of two parts or sections 1 and 2, which are substantially rectangular, the part 1 being formed with top, side, and end walls and lateral flanges 3 and the part 2 being practically solid, with the exception of the ports or openings, and it is also provided with lateral flanges to which the flanges 3 on the part 1 are bolted, as at 5. The valve-seat or part 2 has the port 6 for the exhaust and the port 7, which leads to the train-pipe. The seat is tapped, as at 8 8, to receive the pipe-couplings of the train-pipe and the pipe to the main reservoir. The port 6 is wider and shorter than the port 7.

On the top of seat 2 is the slide 2×, which is adapted to be moved back and forth to open and close the ports in the valve-seat. It is formed on the under side with a transverse chamber 9 and intersecting therewith a V-shaped part 10, so that the ports are closed gradually thereby to prevent shock or jar. On the top of this slide 2× is a lug or projection 11, surrounded by a bushing 12, which is adapted to be engaged by a yoke on the lever 13, which is formed as a part of or carried by the pivot or spindle 14. This spindle 14 is seated in a semicircular projection 15 on one side of the cap or cover.

On the side of the casing opposite the lever below the flange a reducing-valve 16 of ordinary form is provided and is connected by suitable ports to the train-pipe port, the main reservoir, and also to the signal-valve, as well shown in Fig. 3. The signal-valve 17 is arranged, preferably, on the same side of the main valve-seat 2 as the reducing-valve just described. The part 2 is provided with a concavity 18, and the valve comprises a diaphragm 19, which rests on the top of said concavity, a cap 20 on one side of said diaphragm, and a screw-threaded flanged cylindrical piece 21, applied from the opposite side of the diaphragm, and the stem 22 is seated in and held between them, and around the stem thereof is a suitable spring 23. A cap-piece 24 with a concavity the reverse of the one in the main valve-seat is fitted in a recess in said seat, which is tapped, and the cap is secured and the valve 22 and its diaphragm held in position by screwing the parts together. In the wall of the cap-piece 24 and in alinement with the valve-stem is the port 25. This valve 17 is operated through the ports leading to the main reservoir and to the train-pipe by way of the excess-pressure valve.

The operation of this valve will be readily apparent. The pressure of the air from the main reservoir against the diaphragm keeps the valve in a closed position, but when the pressure in the train-pipe and the main reservoir is equalized to, say, about a difference of two pounds the tension of the spring 23 opens the valve and gives warning to the engineer by the escaping air through the port 25. A vertical port 26 is provided in the slide-valve 2×, which communicates with port 27, leading to the excess-pressure valve 16 and through port 28 to the train-pipe port 7. As the slide 2× is moved back and forth the port 26 is brought into alinement with port 27, and thus the pressure in the main reservoir is maintained at a higher point than in the train-pipe, since the valve 16, being an ordinary check-valve, contains a spring which resists the passage of the air. The outside cap or cover of the valve (see Fig. 4) has mounted thereon a semicircular disk 29, having on its periphery the teeth or lugs 30, 31, 32, 33, and 34. The operating-lever 35 is mounted on the end of the spindle 14, which carries the yoke-lever 13. The lever 35 has on its under surface a wedge or V shaped latch 36, and it is also provided with a spring dog or ratchet 37 (see Fig. 7) to hold the latch in engagement. When the brakes are not set, the lever 35 will be in the position shown in Fig. 4. If the lever be moved to engage the lug 31 on its side nearest the lever, the slide 2× is moved sufficiently to bring ports 26 and 27 in alinement, and port 7 to the train-pipe is closed, thus allowing air from the main reservoir to flow to the train-pipe through ports 26 and 27. If the latch be engaged with the opposite side of lug or tooth 31, all the ports to the train-pipe are closed. By a further movement of the lever between the projections or lugs 31 and 32 the chamber or recess 10 gradually uncovers port 7 to the train-pipe, thus allowing part of the pressure to escape through the port 6 and applying the brakes by reduction of pressure. When sufficient air has escaped, the lever is moved back to the edge of projection or lug 31 and the ports are again closed.

In cases of emergency when it is desired to set the brakes hard or quickly the lever is moved until its latch is in engagement with lug or projection 33, thus allowing air to escape very rapidly by bringing the chamber 9 on the slide 2× into communication with ports 6 and 7. If after having used the emergency stop it is found desirable to use direct pressure, the lever 35 is engaged with the lug 34. This moves the slide 2× so that the port 26 alines with port 7 of the train-pipe and the slide is moved far enough to uncover the port 27, thus admitting the air from the main reservoir to the train-pipe through ports 26, 27, and 28.

The lever 35 is secured in place on the spindle by a suitable cap or other form of nut. (See Fig. 7.)

Triple Valve.

The form of triple valve D used on the engine is shown in Figs. 13 and 14. The valve has a substantially cylindrical casing 1', with a substantially cylindrical head 2', having a suitable reciprocating piston therein. On the one side of the cylindrical casing is an angular projection 3', having two ports or openings 4' 5', which partake of the general contour of the projection in which they are located. These two ports 4' 5' intersect at their outlet and lead to the auxiliary reservoir. The casing is also provided with a small port 6' through the walls of the cylinder and a second port which leads to the brake-cylinder through a projection 7' on the side thereof. The head of the valve-casing has peripheral flanges, and the cap c has corresponding flanges, and the two parts are secured together by suitable bolts, as shown. In the center of the cap or cover is the inlet-port 8', which connects with the train-pipe. The stem 9' is arranged to reciprocate back and forth in the valve-cylinder and is provided with a piston-head 10', a little less in diameter than the diameter of the interior of the valve-cylinder head A. A suitable bushing is applied in the valve-cylinder and head and suitable packing to the piston-head. The valve or piston stem 9' is preferably formed in sections, as shown, so that the packing 11' can be more securely applied. The parts are secured to each other in any suitable manner. The piston rod or stem has packing-rings of both leather and metal. The leather packing has small rods or rings of metal inserted in suitable grooves in the rod or stem underneath the leather for expanding the same.

The cap or cover $c$ may be made with an outwardly-projecting convex portion at one side to form a chamber in the head which acts as a drain-cup and which has a small aperture and plug for discharging the fluid. A suitable gasket is applied between the flanges of the casing and cap to prevent leakage. Air enters the port 8' into the head of the valve, a small portion of the bushing or of the piston-head itself being removed to form a port 12' for the passage of the air behind the piston and into the auxiliary reservoir through the port 4' when in normal position. The pressure in the train-pipe and auxiliary reservoir is equal when the piston is in the position shown in Fig. 13. As the pressure in the train-pipe is lowered the pressure of the air in the auxiliary reservoir moves the piston forward sufficiently to cover the small port 12', and at the same time the small port 6' is closed. As the piston is moved still farther forward by the pressure of the air the port 5', leading to the auxiliary reservoir, and also the brake-cylinder port 7' are opened and the air is allowed to flow from the auxiliary reservoir into the brake-cylinder. When the pressure of air in the auxiliary reservoir is reduced somewhat lower than the pressure in the train-pipe, the piston is moved back sufficiently to cover the port 5' and thus keep the brakes set.

When it is desired to release the brakes, the engineer increases the pressure in the train-pipe, thus forcing the piston back to its normal position, closing port 5' and opening port 6', allowing the pressure from the brake-cylinder to escape through the port 6'.

The triple valve D' to be used on the tender is represented in Figs. 15, 16, and 17. The general construction of this valve is the same as the one just described, and in so far as they are alike the same reference-numerals will be used.

The head of the valve-casing with the exception that it has no inlet-port is the same as the valve in Fig. 13, and the two front sections of the piston-stem and the piston-head are also the same. Instead of the inlet-port in the center of cap $c$, I provide a graduating stem and spring for a purpose which will be presently described. A tapped annular projection 1" is fitted with a partially hollow threaded plug 2". A shouldered stem or pin 3" is mounted loosely and plays through an aperture in the cap $c$, and the hollow in the plug forms a guide therefor. A suitable spring 4" surrounds the pin and rests between the end of the plug and the surface of the head.

The port 12", leading to the rear of the piston, is the same as in the engine-valve. The side projections, however, differ in form, and the arrangement of the ports leading to the auxiliary reservoir and brake-cylinder is different and there is one additional one. In the side projection referred to a diagonal port 5" is provided and a vertical port 6", both leading to the auxiliary reservoir, and the ports 7" and 8", leading to the brake-cylinder. An exhaust-port 9" is arranged between the ports 7" and 8". A suitable check-valve 10" is mounted in the wall of the valve-casing at the inner end of the port 8", but as this valve is of usual construction it need not be described in detail, and almost any form of check-valve will answer the purpose.

The rear end of the piston-stem has two more sections than the valve before described, and the packing is arranged thereon in accordance with the changed arrangements of the ports. The parts are secured together in any suitable manner. In this valve the air is admitted through a port 11" into a chamber arranged on the side of the valve-casing and to both ends of the piston. A removable cap 12" is applied on the end of this valve-casing. A series of ports 13" are arranged peripherally through the bushing of the valve-chamber underneath the check-valve, as shown in Fig. 17. The lower portion of the chamber, containing the port 11", is formed as shown and has an aperture or plug, so that it may be used as a drip-cup. Air is admitted to the valve just described through the port 11" from the train-pipe, and passes to both ends of the cylinder when the piston is in its normal position, as shown in Fig. 15.

For ordinary service the pressure in the train-pipe is reduced in precisely the same manner as described in the valve shown in Fig. 1, and this valve acts in substantially the same manner.

In cases of emergency the piston 9' is moved farther, coming into contact with pin 3" and compressing spring 4", thus exposing the port 13", and the pressure of the air from the train-pipe raises the check-valve 10" and passes the air to the brake-cylinder.

The check-valve is an important element of this triple valve for the reason that if the spring 4" should be weak or the piston should work hard or become clogged for any reason the check-valve would stop the flow or passage of air from the brake-cylinder back to the train-pipe.

The triple valve D″ for the cars is represented on Sheet 5 of the drawings. It is a very quick acting valve and is provided with a supplemental or emergency valve. The casing and piston of the main valve are very similar in structure to the triple valve just described, but it differs in certain details which I will now proceed to describe.

The head or cap $c$ of the valve-casing is provided with the graduating stem and spring, as in the valve for the tender and for the same purpose. The ports, however, are differently arranged, and the operation of the valve is much quicker. On one side of the valve-casing a closed hemispherical casing $2'''$ is secured at one side to the casing of a small check-valve, which forms a part of or is secured to the valve-casing. At the other side it is secured to the head of the valve-casing in a suitable manner. This casing $2'''$ has an inlet-port $4'''$ from the train-pipe. Its top portion is a flat plate $5'''$, furnished with ports $6'''$ $6'''$, and a central aperture in which is mounted a small check-valve $7'''$. This valve consists of a flanged or cup-shaped tube $8'''$, closed at its lower end and having a face $9'''$ at its upper end. It is surrounded by a spring $10'''$, which, together with the pressure of the air, holds it in place. A second plate or bushing $11'''$ is arranged at some distance above the plate $5'''$. It has a central aperture surrounded by an annular depending flange, against which the valve rests. It has also depending walls which rest on plate $5'''$ and secured thereto, suitable gaskets being used at the joints to make it air-tight. This forms the chamber for the valve $7'''$. The front end of the chamber has a passage or port $13'''$ into the piston main-valve chamber. Between the plate $11'''$ and this cylinder of the main valve a second chamber is formed and provided with a suitable bushing, and in this chamber is arranged the piston $1'''$ at right angles to the main piston. The stem of this piston extends through the aperture in plate $11'''$ and rests on the valve-seat.

A second check-valve $12'''$ of usual construction is mounted adjacent to the piston-cylinder and connected by a port leading from the valve-chamber with the port that leads to the brake-cylinder. A small port $14'''$ leads into the main-valve chamber from above the piston $1'''$. The air passes from the train-pipe through the inlet-port $4'''$, through the ports $6'''$ $6'''$, and through the port or passage $13'''$ to the front of the piston, then through the port $12'$ to the main piston-cylinder, when the valve is in the position shown in Fig. 18.

The projection on the other side of the valve-casing has the general form of that on the triple valve on the tender, but there is a different arrangement of the ports. The port or passage $12'$ in the bushing and the diagonal ports $15'''$ $16'''$, intersecting at their outlet and leading to the auxiliary reservoir, are substantially the same as in the tender-valve. The vertical port $17'''$ from the valve-chamber and leading to the brake-cylinder is provided with a common check-valve, and the diagonal port $18'''$ leads into the vertical port above or outside of the check-valve. An exhaust-port $19'''$ is provided through the valve-casing in the rear of the projections. A port $20'''$ leads from the check-valve $12'''$ to the port $17'''$, above the check-valve therein, and to the brake-cylinder. The main-valve stem $9''$ is formed of several parts bolted or otherwise secured together, and the leather and metal packings are applied in the same manner as on the other triple valves described. The hemispherical portion of the emergency-valve casing $2'''$ is formed as a drain-cup and has an aperture and plug at its lower portion for withdrawing any moisture which may accumulate. The interior of this valve is bushed, as in the other valves, and the joints are provided with gaskets to prevent leakage. This valve is shown in its normal condition in Fig. 18.

In cases of emergency the pressure in train-pipes is quickly reduced. The main piston is moved forward against the graduating-stem, and as it advances the spring $4''$ is compressed, the packing on the main piston stem or rod uncovers the port $16'''$, and the air passes from the auxiliary reservoir into the emergency-cylinder, through the port $14'''$, against the top of the piston $1'''$, which opens the valve $7'''$ and allows the air from the train-pipe to pass into the emergency-valve chamber, through the check-valve $12'''$ and port $20'''$ to the brake-cylinder. It will be seen that the pressure of the air in the train-pipe is thus rapidly reduced and the brakes applied.

Two forms of retaining-valves are used. Figs. 8, 9, 10, and 11 represent the valve used at each car and connected to the exhaust-port of the triple valve and train-pipe, as shown at F′ on the drawings. It will be understood that I have shown the system as applied to a single car. The further application to additional cars will be apparent. It comprises a practically cylindrical casing $f$, having the head $f'$ screwed or otherwise secured thereto. $f''$ is the valve or piston stem, on each end of which is mounted a head $f^3$. On the stem or rod $f''$ are plates $f^4$, screwed for clamping the packing to the head, as shown. The packing is applied to the head in precisely the same manner as in the triple valve. On one side of the cylinder is a smaller valve-chamber $f^5$, in which is a weighted valve $f^6$, which is adapted to be operated by the pressure of the air which passes from the cylinder through a port $f^7$. An exhaust-port $f^8$ is provided in one end of the main cylinder and a port $f^9$ through the walls of the weighted-valve cylinder. A $\cap$-shaped spring $f^{10}$ is mounted between the stem of the piston and the inner wall of the cylinder and in operation moves with it. This spring steadies the valve-piston and insures its true operation. At one side of the valve are seated two check-valves $f^{11}$ $f^{12}$, (see Fig. 11,) arranged at right angles to each other, and they are substantially alike with the exception that the spring in the valve $f^{12}$ is much weaker than the one in valve $f^{11}$, and they are arranged so that their chambers are intersecting. This valve is connected to the other retaining-valve by means of a suitable pipe and coupling $f^{13}$ on one side of the valve, and a similar coupling $f^{14}$ and pipe connects with the train-pipe. An exhaust-port $f^{15}$ through the walls of the valve-casing from the valve-chamber is provided. When the valve is not in use, a latch $f^{16}$ on the end of the valve (see Fig. 12) may hold it permanently open. The latch comprises a pivoted bar, the free end of which is adapted to be swung underneath an angular catch. This valve operates as follows, viz: The pressure in the train-pipe is increased to about seventy pounds. The check-valve $f^{12}$ is raised from its seat, and the air is allowed to pass in back of the piston and, moving it, closes the exhaust-port, and hence the air admitted from the triple valve through the middle retaining-valve raises the weighted valve. It requires about fifteen pounds of pressure to raise this valve, and therefore about this pressure is retained in the brake-cylinder. To release the valve, the pressure in the train-pipe is increased, which raises the small check-valve $f^{12}$ and also the check-valve $f$, when the pressure will close the first valve and pass to the opposite end of the main piston through the passage in the cylinder, (shown in dotted lines in Fig. 11,) thus forcing the piston back and opening communication from the triple valve to the atmosphere. The pressure in the train-pipe is then reduced. It is specially adapted to heavy grades. I may adjust this valve to use proportionately greater or less pressure. I prefer to use this valve in connection with the second retaining-valve located between it and the triple valve, as the second retaining-valve keeps up the pressure in the brake-cylinder when the auxiliary cylinder is recharged.

The second retaining-valve F is of simple construction and is used adjacent to the quick-acting triple valve. It is shown in cross-section in Fig. 25. It comprises a cylindrical casing with suitable heads and gaskets at the joints, and it has four ports, one $g$ $g'$ at each side and one $g^2$ $g^3$ at each end. The port $g$ leads to the retaining-valve F', the port $g'$ to the triple valve, the port $g^2$ to the train-pipe, and the port $g^3$ in the auxiliary reservoir. A double-head piston $g^4$ is employed in the valve-chamber, and the packing is the same and is clamped to the piston-head in the same manner as in the retaining-valve F'. At the end of the piston and between one of its heads and the inside of one cylinder-head is a spring $g^5$. This spring keeps the valve open when the pressure is about equal in the train-pipe and auxiliary cylinder. When the pressure in the train-pipe is increased, the piston $g^4$ is moved far enough to close ports $g$ and $g'$, leading to the triple valve and retaining-valve F'. The brakes are released when the pressure in the train-pipe and auxiliary cylinder are equal. The object of this valve, as already intimated, is to keep full pressure in the brake-cylinder while the auxiliary reservoir is being filled with air from the train-pipe. When the pressure in the train-pipe is decreased, the piston is pushed back by the action of the spring $g^5$ and communication is established between the triple valve and the other retaining-valve.

When both retaining-valves are operating together, their operation is as follows: When the pressure in the train-pipe is reduced for the application of the brakes, the piston causes the triple valve to close the exhaust-port on the triple valve, and when it is desired to recharge the auxiliary reservoir the pressure in the train-pipe is again increased above that in the auxiliary reservoir. Hence the pressure in the cylinder at the end where passage $g^2$ is in Fig. 25 is greater than the pressure in cylinder at the opposite end of the piston. Hence piston $g^4$ is moved, compressing spring $g^5$ and closing ports $g$ $g'$, hence cutting off the escape of pressure from the triple valve in recharging the auxiliary reservoir, and when the pressure in the auxiliary reservoir is equalized to that in the train-pipe the pressure on both ends of piston $g^4$ is equal and the tension of spring $g^5$ will open ports $g$ and $g'$ and the pressure will escape to retaining-valve F', which in turn will operate as before stated.

The valve E (shown in Figs. 23 and 24) is for changing the pressure from automatic to direct. When this valve is used, the pressure in the train-pipe is reduced to about thirty pounds. A vertical section of this valve is shown in Fig. 23. It comprises a suitable cylinder $e$, closed at one end and having a head or face piece with the proper gaskets secured to the other end.

The cylinder-chamber has the bushings or lining $e'$, and arranged to work therein is the double-headed piston $e^2$. The piston-heads have the packing applied in the same manner as in the other valves. The cylinder has internal peripheral grooves $e^3$ $e^4$, one near each end, and a series of ports $e^5$ $e^6$ through the bushing of the cylinder, which communicate with the grooves $e^3$ $e^4$. A small vertical check-valve $e^7$ is arranged at one end of the cylinder, and a similar valve $e^8$ is arranged horizontally at the other end. The valve $e^7$ has a port $e^9$, leading to the auxiliary reservoir, and the valve $e^8$ has a port $e^{10}$, which leads to the brake-cylinder. A port $e^{11}$ through the main cylinder leads to the triple valve, and a port $e^{12}$ to the train-pipe. In the body of the cylinder, arranged horizontally and intersecting the port to the train-pipe, is a horizontal port or passage $e^{13}$, which is deflected angularly and opens into the chamber of the small check-valve $e^7$. A port $e^{14}$ leads from the cylinder-chamber, through the cylinder-head, to the seat of the check-valve $e^7$, and an exhaust-port $e^{15}$ is also provided through the cylinder-head, below the port $e^{14}$. At the opposite end of the cylinder the port $e^{16}$ leads from the cylinder-chamber to the chamber of the check-valve $e^8$. A headed screw and thumb-knob $e^{17}$ is arranged through one head of the cylinder, and it is screwed in against the piston-head when it is desired to close the valve permanently.

The valve is shown on the drawings in its normal position—that is to say, when automatic pressure is used and the pressure in the train-pipe is decreased to apply the brakes. If it is desired to use the pressure direct from the main cylinder, the pressure from the train-pipe is decreased and the air from the auxiliary reservoir passes through the port $e^9$, raising the small check-valve $e^7$ from its seat, and thence through the port $e^{14}$, moving the piston $e^2$ so as to close the ports $e^5$ and open the ports $e^6$, when the pressure is direct from the train-pipe, through the ports $e^6$ and $e^{10}$, to the brake-cylinders. When the pressure in the train-pipe is increased to about forty pounds, or sufficient to overcome the tension of spring holding valve $e^8$ closed, the pressure will open said valve, and the air from the brake-cylinder passes back through the port $e^{10}$ and through the small port $e^{18}$, which pushes the check-valve $e^8$ from its seat, and enters the main cylinder in rear of the piston-head through the port $e^{16}$ and moves said piston sufficient to open port $e^5$ and close port $e^{10}$. The reason why the triple valve on tender is slower than the triple valve on the cars is that there is more friction in the triple valve on the tender than in that on the cars, and the action of the pressure is slower, as it passes through smaller and narrower passages than in the triple valve on the cars, which is more direct and larger ports can be used. It will thus be seen that for ordinary service the valve is in its normal position, as shown, the passage to the triple valve is open, and that to the brake-cylinder is closed.

If it is desired to stop suddenly, the pressure in the train-pipe is reduced and the excess pressure in the auxiliary reservoir operates the main-valve piston in a manner already explained. The port to the triple valve is closed and communication opened with the brake-cylinder, and by operating the lever in the manner stated in the description of the engineers's brake-valve the pressure is direct from the main reservoir through the train-pipe to the brake-cylinder.

The operation of the system will be fully understood from the foregoing description.

The engineer's brake-valve, triple valves, and auxiliary reservoirs and brake-cylinders, although differing in construction and simpler than those now in general use, have practically the same functions. I use two retaining-valves, one at the end of the exhaust-pipe from the triple valve and the second one between it and the triple valve, for purposes already fully explained. I also provide a novel form of valve, as above described, for changing the pressure from automatic to direct.

The quick-acting triple valve on the cars may be operated from the engine by means of the engineer's brake-valve, or it may be operated by the conductor by mechanism of the customary form on the cars.

Many minor details of construction within the scope of my invention may be made without departing from the spirit thereof.

Having thus fully described my invention, what I claim as new, and desire to secure by Letters Patent, is—

1. A fluid-pressure brake mechanism, comprising an automatic system including the main reservoir, the engineer's brake-valve, the train-pipe, a slow triple valve for the engine, a quicker one on the tender, a still quicker one for the cars, suitable brake-cylinders and auxiliary reservoirs for each triple valve, a retaining-valve connected to the exhaust-port of the triple valve on the cars and a second retaining-valve adjacent to the other retaining-valve to prevent exhaust in recharging the auxiliary cylinder, substantially as set forth.

2. In an air-brake system, an engineer's brake-valve provided with an excess-pressure valve connected by suitable ports to the train-pipe ports, the main reservoir, and to the signal or warning valve; in combination with said signal-valve, which consists of a diaphragm fixed in a suitable concavity in the main valve, with a small valve-stem 22, therein and adapted to be operated by the pressure of the air on the diaphragm, substantially as set forth.

3. In an air-brake system, a triple valve provided with a piston, a graduating spring stop or stem, an inlet-port through a projection on the side of the valve from the train-pipe, a port or passage leading along the cylinder-stem and also to the front of the piston-head, a port through the bushing of the head leading back of the same, inlet and outlet ports from the emergency-valve and main-valve chamber to the auxiliary reservoir and brake-cylinder and a check-valve arranged at the inner end of the port leading from the brake-cylinder, ports underneath the check-valve through the bushing in the cylinder-stem, and an exhaust-port substantially as set forth.

4. In an air-brake system, a triple valve provided with a main piston, a supplemental valve, the piston of which operates at substantially a right angle to the main piston, and which comprises a hemispherical casing with an inlet-port from the train-pipe, a check-valve supported in the top of said casing with ports on each side thereof, a second chamber with the piston therein, the stem of the piston resting on the small valve-seat, the second check-valve adjacent to the auxiliary-valve chamber and having a port leading to the brake-cylinder, a port through the casing of the valve-cylinder, a port leading to the main cylinder-head, inlet and outlet ports to the auxiliary reservoir and brake-cylinder, a check-valve arranged in one of the outlet-ports of the brake-cylinder, and an exhaust-port, substantially as set forth.

5. In an air-brake system, a retaining-valve comprising a cylinder or casing inclosing a double-headed piston with a ∩-shaped spring resting on the stem of the piston and the bow thereof against the inner portion of the cylinder, a weighted valve at the top connected with the valve-casing and communicating with a port therein, two intersecting check-valves at one side having springs of different power and connecting with the train-pipe and suitable connecting and exhaust ports, substantially as set forth.

6. In an air-brake system, a retaining-valve comprising a cylinder or casing, a double-headed piston therein, a weighted valve on one side of the main valve provided with an exhaust-port, and a port leading from the valve-seat into the main cylinder, two intersecting check-valves at right angles to each other and with springs of different power at the opposite side of the cylinder, a passage along the walls of the cylinder, and a lock for keeping the valve open, substantially as set forth.

7. In an air-brake system, a valve for changing the pressure from automatic to direct, comprising a cylinder or casing with an inside bushing, said cylinder having an internal, annular groove near each end in the body of the same and a series of ports or openings through the bushing into said annular grooves, a suitable piston, a port to the train-pipe, one to the auxiliary reservoir, one to the brake-cylinder, and one to the next adjacent triple valve, substantially as set forth.

8. In an air-brake system, a valve for changing the pressure from automatic to direct comprising a cylinder or casing having an inside bushing, an internal annular groove near each end in the body of the cylinder, a series of ports or openings through the bushing into said annular grooves, a suitable piston, a port to the train-pipe, a check-valve above the auxiliary-reservoir port, a port leading from said valve-seat into the main cylinder and a second port above the valve-seat leading to the train-pipe port and suitable ports to the brake-cylinder and triple valve, substantially as set forth.

9. In an air-brake system, a valve for changing the pressure from automatic to direct, comprising a cylinder or casing having an inside bushing, said cylinder having an internal annular groove near each end in the body thereof and a series of ports or openings through the bushing into said grooves, a suitable piston, a port to the train-pipe, a check-valve above the auxiliary-reservoir port, a port leading from said valve-seat into the main cylinder, a second port above the check-valve seat leading to the train-pipe port, an exhaust-port through the head of the main cylinder, a port to the triple valve, a port to the brake-cylinder, a check-valve adjacent to the latter and having ports leading from the check-valve seat to the brake-cylinder port, and from above said valve-seat into the main cylinder, substantially as set forth.

10. In an air-brake system, a valve for changing the pressure from automatic to direct, or vice versa, comprising a cylinder or casing, a double-headed piston therein, a check-valve above the auxiliary-cylinder port, ports therefrom to the main cylinder and train-pipe, a second check-valve adjacent to the brake-cylinder port having ports leading therefrom to the main-cylinder and brake-cylinder port, an exhaust-port in the main cylinder and a port to the train-pipe, substantially as set forth.

11. In an air-brake system, a valve for changing the pressure from automatic to direct or vice versa, comprising a cylinder or casing with an inside bushing, internal grooves near each end of the casing, a series of ports through the bushing into the annular grooves, a double-headed piston in the cylinder, a check-valve above the auxiliary-reservoir port, ports to the main cylinder and train-pipe, a second check-valve adjacent to the brake-cylinder port having ports leading to the main-cylinder and brake-cylinder ports, an exhaust-port in the main cylinder, a port to the train-pipe, and a screw and thumb-nut through one head of the main cylinder for locking it closed, substantially as set forth.

In testimony whereof I affix my signature in presence of two witnesses.

JOHN OLSON.

Witnesses:
GEORGE J. BOND,
J. M. ALDRICH.